United States Patent [19]
Tao et al.

[11] Patent Number: 5,578,907
[45] Date of Patent: Nov. 26, 1996

[54] POWER SUPPLY CIRCUIT

[76] Inventors: Kuang Z. Tao, Block 178, Bishan Street 13, #03-215 Singapore, Singapore, 2057; Kee L. Lim, 63 Hillview Avenue, Unit 08-01, Singapore, Singapore, 2366

[21] Appl. No.: 306,432

[22] Filed: Sep. 19, 1994

[51] Int. Cl.⁶ ........................................ H05B 41/16
[52] U.S. Cl. ................ 315/247; 315/243; 315/209 R; 315/219
[58] Field of Search ........................ 315/209 R, 247, 315/243, 242, 237, 290, 219

[56] References Cited

U.S. PATENT DOCUMENTS 4,109,307  8/1978  Knoll .
5,041,766  8/1991  Fiene et al. ........................ 315/219

Primary Examiner—Robert J. Pascal
Assistant Examiner—Reginald A. Ratliff
Attorney, Agent, or Firm—Greenblum & Bernstein, P.L.C.

[57] ABSTRACT

A power supply circuit for a fluorescent lamp. The circuit includes a switching power supply, such as a square wave switching power supply and a load current smoothing capacitor. A fluorescent tube is connected between the switching power supply and the load current smoothing capacitor. A linking connection from the switching power supply to a main voltage supply includes a rectifier. A first diode is connected between the rectifier and the linking connection, while a second diode is connected between the load current smoothing capacitor and the load. A single current path to the load current smoothing capacitor is defined through the second diode, while a single current discharge path from the load current smoothing capacitor is defined through the first diode. Two stabilizing capacitors are provided that are connected across the switching power supply to stabilize the duty cycle of the power supply circuit, with the load being located between the two stabilizing capacitors. An inductor, connected between the rectifier and a main voltage supply input, is provided to smooth switching noise that may arise.

18 Claims, 3 Drawing Sheets

5,578,907

POWER SUPPLY CIRCUIT

BACKGROUND AND FIELD OF THE INVENTION

This invention relates to a power supply circuit, and more particularly, but not exclusively, for powering a fluorescent tube.

Compact fluorescent lamps have recently become popular, and are sold, for example, by Philips under their Energy Saver brand. Such lamps have a much higher efficiency than corresponding incandescent lamps and also have a substantially longer life.

A fluorescent tube in such a design is conventionally driven by a switching power supply, which can be generally represented as load 10 in FIG. 1, in which load 10 is placed in parallel with an electrolytic capacitor 20, the load 10 and capacitor 20 that is connected to a main voltage supply 30 via a rectifier 40. For such a circuit, it is essential to provide the electrolytic capacitor 20 for smoothing the rectified current and as a d.c. energy reservoir, in order to provide a high-demand-working current to the load. It is a disadvantage of such circuit that the capacitor 20 acts as a peak detector and displays a serious capacitative effect. As shown with reference to FIG. 2, the input current from the main voltage supply, Imain, charges the electrolytic capacitor 20 only when the instantaneous AC voltage exceeds the voltage across the electrolytic capacitor. Thus, the waveform of the main current Imain does not follow a sinusoidal pattern. By comparison of the main voltage supply, Vmain, with the current Imain it can be seen that the fluorescent lamp circuit of FIG. 1 has a very poor power factor.

Having a low power factor has several disadvantages. In particular that, larger components are required in the power supply circuit for the same light output or, alternatively, existing components have to work harder, thus increasing heat dissipation. Furthermore, in commercial establishments such as hotels and factories, where there is a three phase supply, it is necessary to maintain a good power factor over all three phases. Otherwise, there is a risk of unbalanced line power. For this reason, particularly, USA and EEC Regulatory Authorities insist on a power factor of greater than 0.85. In general, a circuit of the kind shown in FIG. 1 will have a power factor of 0.4–0.6.

Accordingly, it is an object of the present invention to provide a power supply circuit having an improved power factor.

SUMMARY OF THE INVENTION

According to the invention, a power supply circuit comprises a switching power supply means for powering a load, a connector linking the switching power supply to a main voltage supply, a load current smoothing capacitor coupled to the switching power supply, and a current flow direction controller controlling charge and discharge paths on the capacitor. The capacitor is charged by the switching power supply means and discharged to the connector.

Preferably, the circuit is for use with a fluorescent tube as the load, with the current flow direction controller, including diodes disposed between the capacitor and the switching power supply and between the capacitor and the connector determines the direction of current flow.

Preferably, a resistor is connected in series with the diode connected to the connector, to provide a RC circuit together with the capacitor to smooth the input current wave form at the time the diodes turn on. Preferably, the connector comprises a mains voltage rectifier and an inductor connected between a main voltage supply and the rectifier, the inductor providing a time-lead to smooth the input current waveform still further and reduce high harmonic content of the input AC current caused by the switching of the power supply and controller.

Preferably the power supply is provided with first and second load capacitors connected across the connector the load being connected between the capacitors and to the switching power supply. The capacitors provide a source of start up current for the switching power supply and force an even duty cycle to ensure output regulation for the load current smoothing capacitor.

Since the load current smoothing capacitor charges via the switched power supply and not directly from the connector, the capacitor is not the direct load of the main voltage supply and thus its capacitative effect is minimized, with the direct load (almost entirely the switching power supply means) just exhibiting a resistance effect. Although the invention has a particular application for use as part of a fluorescent lamp in which the load comprises a fluorescent tube, it will be appreciated that it can be used with other applications which require a load current smoothing or supply capacitor.

BRIEF DESCRIPTION OF THE DRAWINGS

An embodiment of the invention will now be described by way of example with reference to the accompanying drawings.

DETAILED DESCRIPTION OF THE PREFERRED EMBODIMENT

Figure 1:
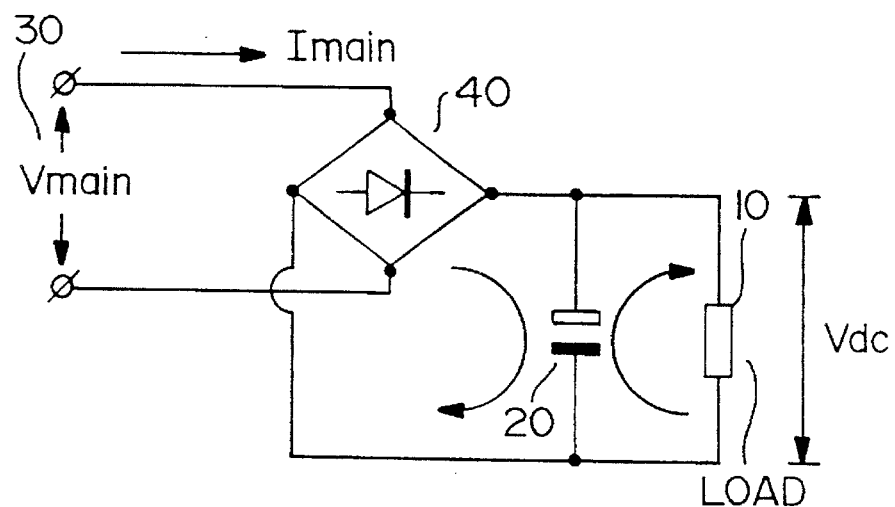
FIG. 1 illustrates a prior art fluorescent lamp supply circuit.
Figure 2:
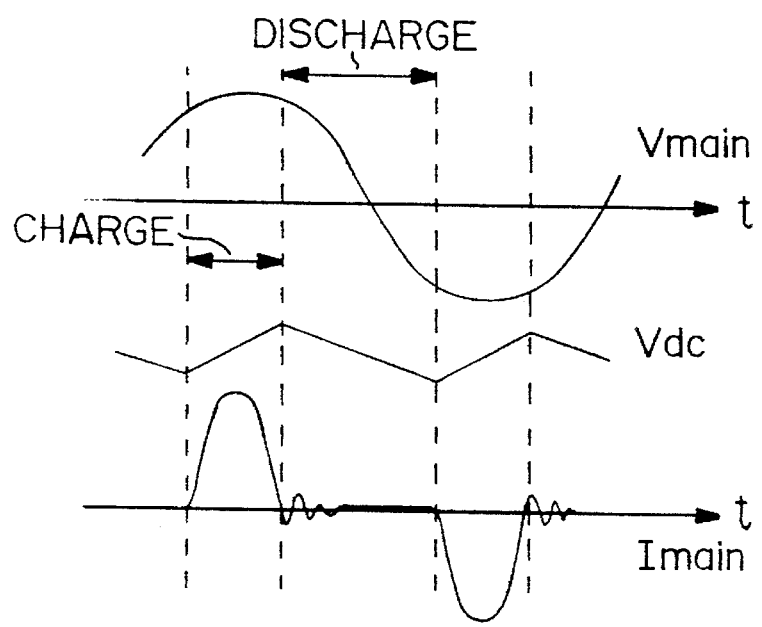
FIG. 2 is a wave form diagram illustrating the operation of the prior art circuit of FIG. 1.
Figure 3:
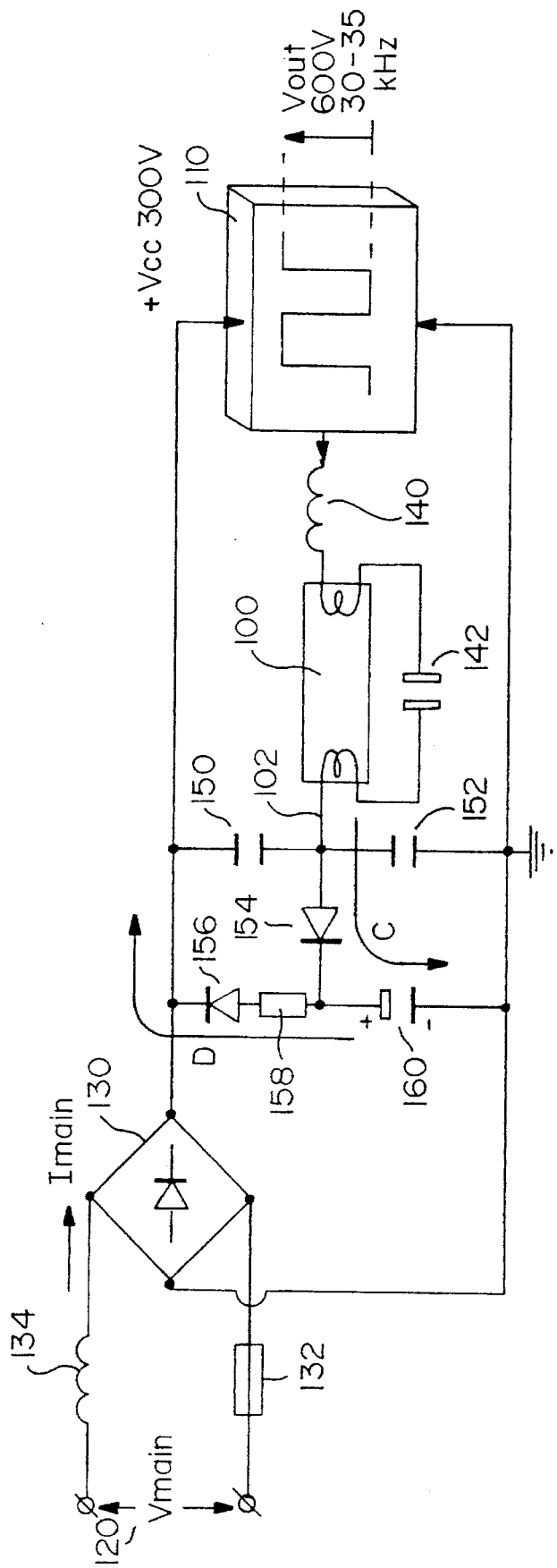
FIG. 3 is a circuit illustrating an embodiment of the invention.
Figure 4:
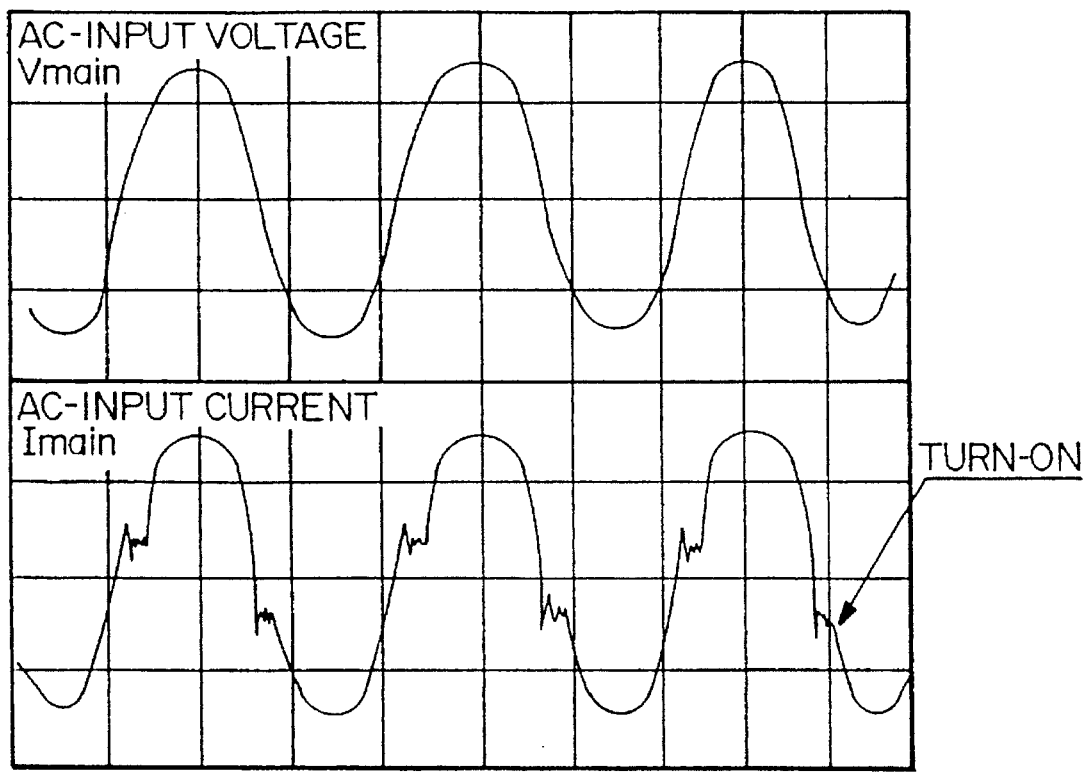
FIG. 4 a wave form diagram illustrating the input current and voltage wave forms of the embodiment of FIG 3.

With reference to FIG. 3, an embodiment of the invention is shown, for powering a fluorescent lamp load 100. The load 100 is driven by a square wave switched power supply 110 of conventional construction to provide a square wave output voltage waveform Vout of 600 V at 30–35 kHz, the power supply 110 being connected to main voltage supply 120 via rectifier 130. A fuse 132 is provided on one input line of the main voltage supply 120 between rectifier 130 and main voltage supply 120. An inductor 134 is provided the other input line of the main voltage supply 120.

One terminal of fluorescent tube 100 is connected to switched power supply 110 via current regulation inductor 140, with tube starting capacitor 142 being connected across the tube 100. The other terminal of tube 100 is connected between two capacitors 150, 152 and is further connected via diode 154 to an electrolytic capacitor 160. The capacitor 160 is connected between the ground rail and the DC voltage rail via a further diode 156 and resistor 158.

The capacitor 160 is required for operation of the fluorescent lamp 100, in particular to smooth the pulsating output of rectifier 130 and to store energy for use in driving the fluorescent tube 100. It can be seen, however, that due to the presence of diodes 154, 156, the charge and discharge paths of the capacitor are constrained. In particular, the capacitor 160 can only be charged from the switched power supply 110 via the load 100 through diode 154 along charge path C, since diode 156 is reverse biased. Similarly, capacitor 160 is only able to discharge through diode 156 on discharge path since diode 154 otherwise being reverse biased.

As a result of these connections, capacitor 160 is never directly charged from the rectified main voltage supply but only from switched power supply 110. Consequently, the capacitative effect exhibited in the prior art due to capacitor 160 on the current waveform Imain is removed.

The only direct load of rectifier 130 are small capacitors 150, 152. The presence of these small capacitors 150, 152, is to assist in supplying current when starting the switched power supply 110, to provide a lower working current at low required power levels and to force an even duty cycle onto the switched power supply 110, thus maintaining the charging voltage on the capacitor 160 equal to the line voltage Vcc (the diode 154 acting as a half bridge rectifier causing a halving of the voltage Vout from power supply 110, for a 50% duty cycle).

Inductor 134 between rectifier 130 and the main voltage input 120 creates time-lead to smooth high frequency switching noise generated by the power supply 110 and diodes 154, 156 in the Imain wave form when it reaches a maximum value.

Figure 5:
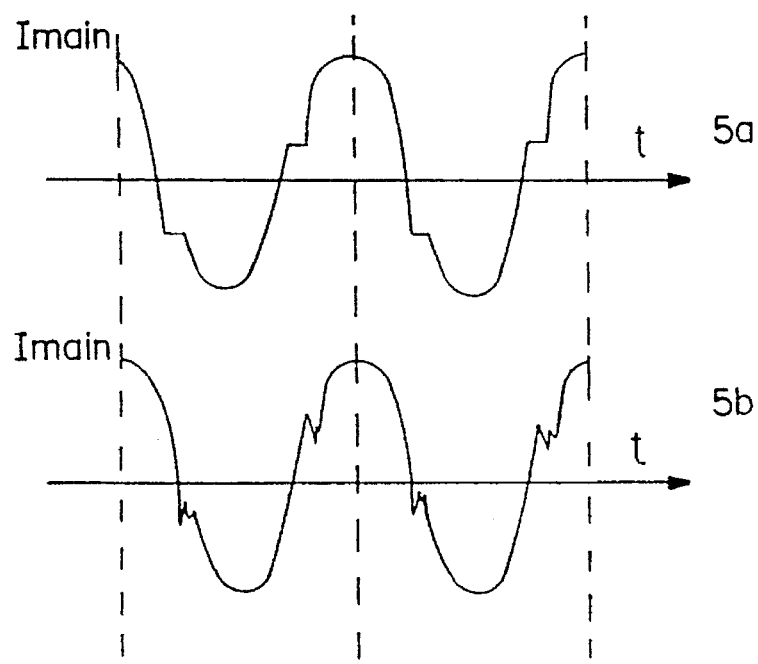
FIGS 5*a* and 5*b* are before and after waveform diagrams showing the effect of adding a resistor in series with a capacitor to form an RC circuit in the embodiment of FIG 3.

Resistor 158, positioned in series with capacitor 160, together form a RC circuit creating a time-lag to reduce dI/dt with current in respect to time when diodes 154, 156 turn on. This is illustrated with reference to FIGS. 5a and 5b. As shown in FIG. 5a, the Imain waveform for the circuit without resistor 158, is shown. When the diodes 154, 156 turn on, a step in the Imain current waveform develops. The inclusion of resistor 158 as shown in FIG. 5B makes this change far more gradual, thus improving the power factor further.

The operation of the embodiment will now be described.

When power is applied at main voltage supply 120, a rectified sine waveform is applied to power supply 110. Capacitors 150, 152 charge up, smoothing the input current waveform to the switched power supply 110 and assisting the starting operation of switched power supply 110. As switched power supply 110 starts, the output current passes through the load 100 and through diode 154 to charge capacitor 160 along path C. When energy stored in the capacitor 160 is required to smooth the troughs in the supply current waveform, Capacitor 160 is discharged through diode 156 on path D to provide additional current as required by the switched power supply 110.

Resistor 158 smooths the diode turn on transition points thus improving the power factor further, as does inductor 134 which further smooths the current transitions caused by the switched power supply 110 and turning on and off diodes 154, 156.

The action of the diodes 154, 156, resistor 158, capacitors 150, 152 and inductor 134 each contribute to an increase in power factor and these components, when properly selected provide a fluorescent lamp circuit having a power factor approaching unity.

Since the capacitor 160 is only charged by the power supply 110, the charging of the capacitor 160 and the starting of the switched power supply 110 is quite soft and thus can prolong the fluorescent tube's life span.

Typical value of the components is shown as follows:

| | |
|---|---|
| Inductor 134: | 10mH/Q>20 @ 1kHz |
| Resistor 158: | 1.5k/20V |
| Diodes 154, 156: | IN 4007 1A/1kV |
| Capacitors 150, 152: | 0.047vf/400V |
| Capacitor 142: | 0.0033uf/1kV |
| Inductor 140: | 3.0mH/Q>10 @ 1kHz |
| Capacitor 160: | 4.7 uf/350v |

Although the invention has been described with reference to a fluorescent lamp, this is not to be construed as limitative and any suitable load may be used with the power supply circuit.

We claim:

1. A power supply circuit used with a main voltage supply to operate a load, comprising:

a switching power supply that powers the load;

means for linking said switching power supply with the main voltage supply, said linking means comprising a rectifier and a load current smoothing capacitor coupled to said switching power supply; and current flow direction control means for controlling a charge path and a discharge path of said load current smoothing capacitor, whereby said load current smoothing capacitor is charged solely by said switching power supply and discharged to said linking means, the load being connected in series with said switching power supply and said load current smoothing capacitor.

2. A circuit as claimed in claim 1, wherein the capacitor is an electrolytic capacitor.

3. A circuit as claimed in claim 1, wherein the load comprises a fluorescent tube.

4. A circuit as claimed in claim 1, wherein said current flow direction control means comprises a diode connected between said capacitor and said switching power supply.

5. A circuit as claimed in claim 1, wherein said current flow direction control means comprises a diode connected between said load current smoothing capacitor and said linking means.

6. A circuit as claimed in claim 5, further comprising a resistor connected in series with said diode.

7. A circuit as claimed in claim 1, further comprising a capacitance connected to said linking means and across said switching power supply.

8. A circuit as claimed in claim 7, wherein said capacitance comprises first and second capacitors and means for connecting the load between said first and second capacitors.

9. A circuit as claimed in claim 1, wherein said linking means further comprises an inductor connected between an input of said rectifier and said main voltage supply.

10. A power supply circuit, comprising:

a switching power supply;

a load current smoothing capacitor;

a load connected between said switching power supply and said load current smoothing capacitor;

means for linking said switching power supply to a main voltage supply, said linking means comprising a rectifier, said rectifier being connected to first and second main voltage supply inputs of said main voltage supply;

first current flow direction control means connected between said load current smoothing capacitor and said linking means;

second current flow direction control means connected between said load current smoothing capacitor and the load, wherein a single current discharge path to said load current smoothing capacitor is defined through said second current flow direction means, and a single current discharge path from said load current smoothing capacitor is defined through said first current flow control means;

duty cycle control means connected across said linking means; and switching noise smoothing means connected between said rectifier and one of said first and second main voltage supply inputs.

11. A circuit as claimed in claim 10, wherein at least one of said first and second current flow direction control means comprise a diode.

12. A circuit as claimed in claim 10, further comprising a resistor in series with said first current direction control means to form a RC circuit with said load current smoothing capacitor.

13. A circuit as claimed in claim 10, wherein the duty cycle control means comprises first and second capacitors connected across said linking means, said load being connected therebetween.

14. A circuit as claimed in claim 10, wherein said switching noise smoothing means comprises an inductor.

15. A circuit as claimed in claim 10, wherein said load comprises a fluorescent tube.

16. A fluorescent light including a circuit as claimed in claim 15.

17. A power supply circuit, comprising:

a square wave switching power supply;

a load current smoothing capacitor;

a fluorescent tube connected between said switching power supply and said load current smoothing capacitor;

means for linking said square wave switching power supply to a main voltage supply, said linking means comprising a rectifier, first and second main voltage supply inputs of said main voltage supply being connected to said rectifier;

a first diode connected between said load current smoothing capacitor and said linking means;

a second diode connected between said load current smoothing capacitor and said load, whereby a single current path to said load current smoothing capacitor is defined through said second diode, and a single current discharge path from said load current smoothing capacitor is defined through said first diode;

first and second capacitors connected across said linking means, said load being connected therebetween; and an inductor connected between said rectifier and one of said first and second main voltage supply inputs.

18. The power supply circuit of claim 6, wherein said load comprises a fluorescent lamp and resistor, which together with said load current smoothing capacitor forms an RC circuit to smooth turn-on transition points of said current flow direction control means.

* * * * *